United States Patent Office 3,646,110
Patented Feb. 29, 1972

3,646,110
BIS-(4-HYDROXY-3,5-DIALKYLBENZYL)
CARBOXYLIC ACID ESTERS
Heinz Eggensperger, Gadernheim uber Bensheim, Volker Franzen, Heidelberg, Karl-Heinz Diehl, Bensheim, Bergstrasse, and Wilfred Kloss, Kolmbach uber Bensheim, Germany, assignors to Deutsche Advance Produktion G.m.b.H., Lautern am Odenwald, Germany
No Drawing. Filed Mar. 18, 1968, Ser. No. 714,100
Claims priority, application Germany, Mar. 17, 1967,
D 52,555
Int. Cl. C07c *69/76, 121/76;* C08f *45/58*
U.S. Cl. 260—473 S                  7 Claims

ABSTRACT OF THE DISCLOSURE

Bis - (4 - hydroxy - 3,5 - dialkylbenzyl) carboxylic acid esters, particularly those of cyanoacetic and malonic acid, are stabilizers for resins. They are prepared by reacting 2 moles of the corresponding benzyl halides or Mannich bases with 1 mole of carboxylic acid ester.

---

This invention relates to novel dialkyl benzyl carboxylic acid esters which are useful for stabilizing resins against the effects of oxygen, light, and heat.

The novel esters are bis-(4-hydroxy-3,5-dialkyl-benzyl)-carboxylic acid esters of the general formula

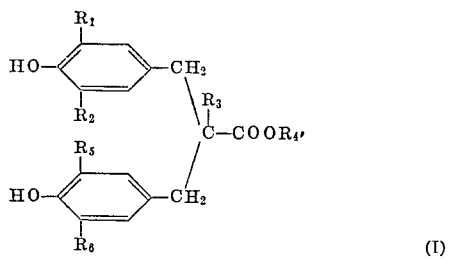

(I)

In this formula, $R_1$, $R_2$, $R_5$ and $R_6$ are the same or different linear or branched alkyl groups having 1 to 6 carbon atoms,
$R_3$ is H, CN, or $COOR_4$, wherein
$R_4$ is a linear, branched, cyclic, saturated or unsaturated alkyl, thioether, ether, or aralkyl group, having 1 to 20 carbon atoms.

Said compounds can be prepared by reacting a total of 2 moles of either.

(a) The same or different benzyl halides of the formulae

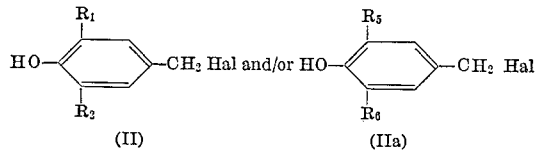

wherein Hal is halogen, in the presence of alkali metal, or
(b) The same or different Mannich bases of the general formulae

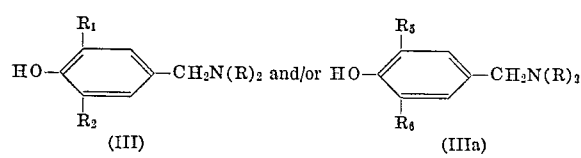

wherein R is preferably lower alkyl, in the presence of a catalytic amount of an alkali or alkaline earth metal base, preferably an alkali or alkaline earth metal alcoholate, with 1 mole of a carboxylic acid ester of the formula

(IV)

in an anhydrous inert organic solvent.

As inert solvents, aromatic hydrocarbons are preferred. Other suitable solvents are other hydrocarbons, glycol ethers and other high boiling ethers, also the alcohols corresponding to the radical R.

While the preparation of the benzyl halides of formulae II and IIa meets still with some difficulties and the yields of their reaction with carboxylic acid esters of Formula IV are only about 50 percent of theory, the Mannich bases of Formulae III and IIIa react almost quantitatively with the carboxylic acid esters, which provides for a very economic procedure. The Mannich bases themselves are readily available by the reaction of phenols, formaldehyde, and secondary amines, such as dimethylamine.

A preferred method for the preparation of symmetrical bis-products from Mannich bases consists in refluxing two moles of a Mannich base with 1 mole of carboxylic acid ester (malonic acid ester, cyanoacetic acid ester) in the presence of 1 to 20 g. of an alkali metal or alkaline earth metal alcoholate in a suitable solvent, e.g., in 1 liter of toluene, under nitrogen for ½ to 4 hours. When the reaction is terminated, the reaction mixture is cooled and the reaction product is recovered. For this purpose, the catalyst is first removed, e.g., by neutralization with dilute acid and shaking out with water, and then the reaction solution is dried. The solvent is distilled off under reduced pressure and the residue may be purified by recrystallization. The yield is generally about 80 to 99 percent.

In the preparation of the asymmetrical bis-products, which are particularly effective, first only one mole of carboxylic acid ester (IV) is reacted with only one mole of Mannich base (III) according to the following equation to form intermediate compound (V)

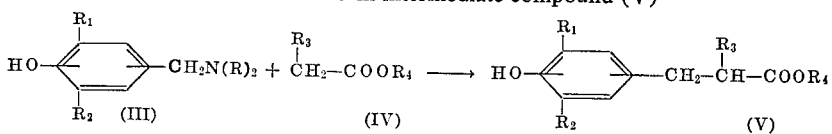

This compound is then further reacted with one mole of Mannich base (IIIa) to form compound (I). Both reactions can be carried out in the same reaction vessel in a similar way as described above for the preparation of the symmetrical compounds; in the case of the asymmetrical compounds, the two Mannich bases are added to the reaction vessel successively for refluxing whereby the second Mannich base is generally added about 2 hours after the first base.

The reaction here involved is a "C-alkylation" of the phenol Mannich bases to disubstituted malonic acid or cyanoacetic acid esters. The literature indicated that such C-alkylation would be possible only when the difficulty available ammonium salts of the phenol-Mannich base are used as starting material (see H. Hellmann and G. Opitz, α-Aminoalkylation," 1960, p. 284). It was not to be expected that the reaction described herein would be possible and would produce smoothly the novel malonic and cyanoacetic esters of the phenol Mannich bases.

The bis - (4 - hydroxy - 3,5 - dialkyl - benzyl) mono-carboxylic ester compounds of Formula I, wherein $R_3$=H, are obtained by saponification and decarboxylation of the corresponding cyanoacetic or malonic acid esters.

The following examples are given to illustrate the invention but not to limit its scope.

EXAMPLE 1

Preparation of bis-(4-hydroxy-3,5-di-tert. butyl-4-hydroxybenzyl) cyanoacetic acid ethyl ester 263.4 g. (1 mole) of (4-hydroxy-3,5-di-tert.butyl-benzyl) dimethylamine, 51 g. (0.45 moles) of cyanoacetic acid ethylester, 3 g. of magnesium ethylate, and 5 g. of sodium methylate were refluxed in 1 liter of absolute alcohol for 1.5 hours; after cooling, the precipitated reaction product was filtered. The reaction product was shaken out with 96% alcohol and once recrystallized from 1.5 liter of acetone. Yield: 255 g. (99% of theory) M. 212-213° C.

Analysis.—Found (percent): C, 76.3; H, 9.13. Calc. (percent): C, 76.3; H, 9.35.

EXAMPLE 2

Preparation of bis-(4-hydroxy-3-methyl-5-tert. butylbenzyl) malonic acid distearyl ester (STABILIZER I)

27.6 g. (0.125 mole) of (4-hydroxy-3-methyl-5-tert. butylbenzyl) dimethylamine, 30.5 g. (0.05 mole) of malonic acid distearyl ester, and 0.5 g. of sodium methylate were refluxed in 100 cc. of absolute toluene for 2½ hours while a current of nitrogen was passed through the reaction mixture. After cooling, the reaction mixture was diluted with methylene chloride, shaken out with 2 N hydrochloric acid and water, and evaporated to dryness. The residue was slurried in methanol, filtered, and washed. Yield: 41 g. (85% of theory) M. 83–90° C.

Analysis.—Calc. (percent): C, 78.69; H, 11.32; O, 9.98. Found (percent): C, 79.25; H, 10.66; O, 9.99.

EXAMPLE 3

Preparation of 1 - (3 - methyl - 5 - tert.butyl - 4 - hydroxyphenyl) - 3 - (3,5 - di - isopropyl - 4 - hydroxyphenyl)-2,2-bis-carbostearoxy propane 4.4 g. (0.02 mole) of (4-hydroxy-3-methyl-5-tert.butyl-benzyl)-dimethylamine, 12.2 g. (0.02 mole) of malonic acid distearyl ester, and 0.2 g. of sodium methylate in 100 cc. of absolute xylene were refluxed under nitrogen for 2 hours. Subsequently, 5 g. (0.213 moles) of (4-hydroxy-3,5-diisopropylbenzyl)-dimethylamine were added, and the mixture was again refluxed for 1½ hours. After cooling, the reaction mixture was shaken out first with 2 N hydrochloric acid, then with water, dried, and the solvent was evaporated in vacuo. After recrystallization from an isopropanol-methanol mixture, there were obtained 16 g. (82% of theory) of the reaction product, M. 90–93° C.

Analysis.—Calc. (percent): C, 78.79; H, 11.37; O, 9.84. Found (percent): C, 78.72; H, 11.09; O, 9.90.

EXAMPLE 4

Preparation of bis - (3,5 - di - tert.butyl - 4 - hydroxybenzyl) - malonic acid - di - (3 - hexylmercapto)-propylester (STABILIZER II)

(a) By reaction of 2,6 - di - tert.butyl - 4 - bromomethylphenol with malonic acid di(3-hexylmercapto) propyl ester.

42 g. (0.1 mole) of malonic acid di(3-hexyl mercapto) propyl ester and 60% (0.2 mole) of 2,6-di-tert.butyl-4-bromomethyl phenol in 100 cc. of petrol ether were added, with stirring, to a suspension of 4.6 g. (0.2 g. atom) of sodium in 320 cc. of petrol ether, and the mixture was refluxed for 3 hours.

The reaction solution was then washed with water and dried, and the solvent was evaporated in vacuo. The residue was recrystallized once from petrol ether. M, 84–86° C.; yield, 33.2 g.=39.6% of theory.

(b) By reaction of the Mannich base of 2,6-di-tert. butylphenol with malonic acid di(3-hexylmercapto) propyl ester.

23 g. (0.055 mole) of malonic acid di(3-hexylmercapto) propyl ester, 32.8 g. (0.125 mole) of Mannich base, and 0.5 g. of sodium methylate were refluxed in 100 cc. of absolute toluene for 1.5 hours, and, after cooling, washed with 2 N hydrochloric acid, dried, and concentrated to dryness. The residue was twice recrystallized from petrol ether. Yield: 26.9 g.=80% of theory.

Analysis.—Calcd. (percent): C, 73.08; H, 7.82; O, 11.45; S, 7.65. Found: C, 72.76; H, 8.03; O, 11.22; S, 7.47.

In an analogous manner, the following compounds were prepared:

Bis - (3,5 - di - tert.butyl - 4 - hydroxybenzyl) malonic acid di(3-laurylmercapto) propyl ester (Stabilizer III); M. 71–73° C.; yield 70%; α-(4-hydroxy-3,5-di-tert.butyl-benzyl) α' - (4 - hydroxy - 3 - tert.butyl - 5 - methyl-benzyl)-malonic acid distearyl ester (Stabilizer IV) M. 87–90° C.; yield 81%.

Other compounds prepared in the same way are listed in Table I, where they are defined by their substituents according to Formula I. Their structure was determined on the basis of their molecular weight, IR spectra, and quantitative analysis.

TABLE I

| $R_1$ | $R_2$ | $R_5$ | $R_6$ | $R_3$ | $R_4$ |
|---|---|---|---|---|---|
| Tert.butyl | Tert.butyl | Tert.butyl | Tert.butyl | —H | —$CH_3$ |
| Do | do | do | do | —CN | —$C_2H_5$ |
| —$CH_3$ | do | —$CH_3$ | do | —CN | —$C_2H_5$ |
| —$CH_3$ | do | —$CH_3$ | do | —CN | —$C_{12}H_{25}$ |
| —$CH_3$ | do | —$CH_3$ | do | —CN | —$C_{16}H_{33}$ |
| —$CH_3$ | do | —$CH_3$ | do | —CN | —$(CH_2)_3SC_{16}H_{33}$ |
| Tert.butyl | do | Tert.butyl | do | —$COOR_4$ | —$(CH_2)_2SC_{16}H_{33}$ |
| —$CH_3$ | —$CH_3$ | —$CH_3$ | —$CH_3$ | —$COOR_4$ | —$C_2H_5$ |
| —$CH_3$ | Tert.butyl | —$CH(CH_3)_2$ | —$CH(CH_3)_2$ | —$COOR_4$ | —$C_{18}H_{37}$ |
| Tert.butyl | do | Tert.butyl | Tert.butyl | —$COOR_4$ | —$CH_2$—CH—$C_4H_9$<br>\|<br>$C_2H_5$ |
| Do | do | do | do | —$COOR_4$ | —$CH_2$—CH=$CH_2$ |
| Do | do | do | do | —$COOR_4$ | -$CH_2CH_2OC_4H_9$ |
| Do | do | do | do | —$COOR_4$ | -⟨H⟩ |
| Do | do | do | do | —$COOR_4$ | -$CH_2$-⟨⟩ |

The dialkylbenzyl carboxylic acid esters of the invention are good stabilizers against deterioration by oxygen, light and heat of polymers such as polyolefins, polyamides, shock resistant polystyrene, ABS resins (copolymers of acrylonitrile, butadiene, and styrene), MBS resins (copolymers of methacrylic acid esters, butadiene, and styrene), homopolymers and copolymers of vinyl chloride, and similar resins.

Good stabilizing effects are particularly obtained with compounds of the following formulae

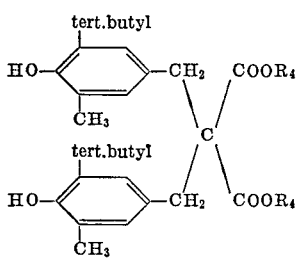

VI

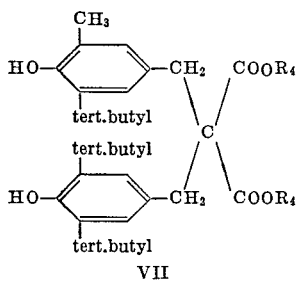

VII and mixtures of these compounds with each other or with sulfur containing stabilizers such as bis esters of thiodipropionic acid. We prefer to use compounds in which the $R_4$ group contains more than 6 carbon atoms and sulfur in form of a thioether group. Good stabilizers are also mixtures of said compounds with the compounds of Formula V.

The novel stabilizers have excellent compatibility with the resins and, due to their low volatility, remain effective even after prolonged thermal exposure of the resin. Generally, they are employed in an amount of 0.01 to 10 percent by weight of the resin. As shown in the examples, they are superior to the esters described e.g. in the German patent publication (DAS) 1,201,349 and to the frequently proposed thiobisphenols.

The following examples are given to illustrate the invention but it is to be understood that the resins and stabilizers employed may be substantially by similar compounds and that the scope of the invention is not to be limited to the specific compounds and resins. All parts are by weight, unless indicated otherwise.

EXAMPLE 5

Stabilization of polypropylene

Two types of unstabilized polypropylene powder, A and B, were used. For the tests reported in Table II, 100 parts of polypropylene, containing the amounts of stabilizer as indicated, were hot milled at 180° C. for 10 minutes and sheeted off.

The films were plied up and pressed under a pressure of 200 atm. at 210° C.

The obtained plates of 1 mm. thickness were cut into 5 strips which were aged in a circulating air oven at 150° C., and the begin of brittleness was noted.

TABLE II

| Stabilizer | | Days before beginning of oxidative degradation |
|---|---|---|
| Polypropylene: | | |
| A | 0.5 part 4,4'-thio-bis-(6-tert.butyl-m-cresol. | 11 |
| A | 0.5 part β-(3,5-di-tert.butyl-4-hydroxyphenyl)-propionic acid stearyl ester. | 46 |
| A | 0.5 part stabilizer I | 75 |
| A | 0.5 part stabilizer V [1] | 72 |
| B | 0.3 part 4,4-thio-bis-(6-tert.butyl-m cresol). | 17 |
| B | 0.3 part β-(3,5-di-tert.butyl-4-hydroxyphenyl)-propionic acid stearyl ester. | 20 |
| B | 0.1 part β-(3,5-di-tert.butyl-4-hydroxyphenyl)-propionic acid stearyl ester +0.2 part DLTDP.[2] | 24 |
| B | 0.3 part stabilizer II | 43 |

[1] A mixture of 10 parts of stabilizer I and 90 parts of (4-hydroxy-3-methyl-5-tert.butylbenzyl)-malonic acid distearylester (corresponding to Formula V).
[2] Dilaurylthiodipropionate.

EXAMPLE 6

Stabilization of low pressure polyethylene 20 g. each of low pressure polyethylene and 20 mg. of the stabilizer listed in Table III were processed on a plastograph at 220° C. and 30 r.p.m. and the time was noted until the torque dropped, indictaing degradation of the polymer.

TABLE III

Stabilizer: Torque decreased after (minutes)
β-(3,5-di-tert.butyl - 4 - hydroxyphenyl)-propionic acid stearyl ester _____ 40±2
β - (3,5-di-tert.butyl - 4 - hydroxyphenyl)-propionic acid stearyl ester +20 mg. DLTDP _____ 135±2
Stabilizer III _____ 140±2

The table shows the superiority of the stabilizer of the invention over the known stabilizers of similar type.

EXAMPLE 7

Stabilization of high pressure polyethylene

Samples of 100 g. of high pressure polyethylene containing the stabilizers reported in Table IV were stored in a drying cabinet at 150° C., and the times to yellow discoloration were determined.

TABLE IV

Stabilizer: Hours to begin of discoloration
0.01 part 2,6-di-tert.butyl-p-cresol +0.01 part DLTDP _____ 20
0.02 part β-(3,5-di-tert.butyl-4-hydroxyphenyl)-propionic acid stearyl ester _____ 26
0.02 part Stabilizer IV _____ 28
0.02 part Stabilizer II _____ 35

EXAMPLE 8

Stabilization of polyamide 100 parts of polyamide containing 1 part of the stabilizers listed in Table V were processed on an extruder at 250° C. to plates which were divided into 5 strips and subjected to accelerated ageing in a drying cabinet at 250° C. The stabilizing effect was determined by the brittleness of the samples.

TABLE V

| Stabilizer: | Became brittle after days |
|---|---|
| 1 part 4,4'-thio-bis-(6-tert.butyl-m-cresol) | 17 |
| 1 part β-(3,5-di-tert.butyl-4-hydroxyphenyl) propionic acid stearyl ester | 13 |
| 0.5 part copper-II-acetate, 0.5 part potassium iodide | 19 |
| 0.5 part stabilizer I, 0.5 part tris-nonylphenyl phosphite | 20 |
| 0.5 part stabilizer V, 0.5 part tris-nonylphenyl-phosphite | 22 |

The table shows that the stabilizers of the invention exceed the effectiveness of known antioxidants. An addition of organic phosphite improves further the initial color of the extruded plates.

EXAMPLE 9

Stabilization of an ABS resin

All the tests hereinafter set forth in Table VI were made with the same ABS polymer which had the approximate composition by weight of 5% acrylonitrile, 15% butadiene, and 80% styrene. Test samples were prepared by hot milling at about 160° C. for 10 minutes compositions containing 100 parts of the ABS resin, 1 part of a lubricant (1,2-bis-stearoyl amino ether) and 0.5 part of the stabilizer. The obtained films were pressed under a pressure of 200 atm. and a temperature of 180 C. to plates of 1 mm. thickness, which were cut to strips and placed in a drying cabinet at a temperature of 110 C. for accelerated ageing. The stabilizing efficiency was measured by the change of color and brittleness of the strips. The following results were obtained.

TABLE VI

| Stabilizer | Color after 50 days | Brittle after days |
|---|---|---|
| 4,4'-thio-bis-(6-tert.butyl-m-cresol) | Brown | 40 |
| β-(3,5-di-tert.butyl-4-hydroxyphenyl)-propionic acid stearyl ester | Light yellow | 36 |
| Stabilizer II | Pale yellow | 43 |

EXAMPLE 10

Stabilization of an MBS resin

The tests listed in Table VII were made with the same MBS polymer which had the approximate composition by weight of 16% methacrylic acid ester, 80% butadiene, and 4% styrene.

Test samples were prepared by hot milling at 170° C. for 10 minutes the resin compositions containing the stabilizer and pressing the obtained films in a platen press under a pressure of 200 atm. at a temperature of 190° C. to plates of 1 mm. thickness which were cut into 5 strips and aged in a drying cabinet at 90° C.

The stabilizing effect was determined by the color changes and brittleness of the strips. The following results were obtained.

TABLE VII

| Stabilizer | Color after 20 days | Brittle after days |
|---|---|---|
| 0.5 part 4,4'-thio-bis-(6-tert.butyl-m-cresol) | Brown | 38 |
| 0.25 part 2,6-di-tert.butyl-p-cresol +0.25 part tris-nonylphenylphosphite | Yellow | 57 |
| 0.25 part stabilizer I +0.25 part tris-nonyl-phenylphosphite | Light yellow | 65 |
| 0.25 part stabilizer V +0.25 part tris-nonyl-phenylphosphite | do | 62 |

EXAMPLE 11

Stabilization of impact resistant polystyrene

The impact resistant polystyrene was a blend of 88 parts of polystyrene and 12 parts of a butadiene-styrene copolymer which contained as stabilizer 1.2% of tris-nonylphenyl phosphite. 12 g. each of said copolymer were plasticized on a laboratory roller mill at 175° C., then 0.15 g. of the stabilizer listed in Table VIII, and subsequently 88 g. of polystyrene were added, and the blends were hot milled at 175° C. for 10 minutes and at 180 C. and 200 atmospheres pressed to plates which were cut into 5 strips and stored in a drying cabinet at 85° C. The stabilizing effect was determined by the time of beginning brittleness of the samples.

TABLE VIII

| Stabilizer | Color after 10 days | Brittle after days |
|---|---|---|
| 4,4'-thio-bis-(6-tert.butyl-m-cresol) | Deep yellow | 25 |
| β-(3,5-di-tert.butyl-4-hydroxyphenyl)-propionic acid stearyl ester | Yellow | 17 |
| Stabilizer II | Pale yellow | 25 |

We claim:

1. Bis-(4-hydroxy-3,5-dialkyl-benzyl) carboxylic esters of the formula

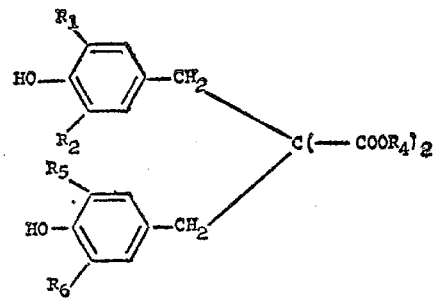

wherein $R_1$, $R_2$ $R_5$ and $R_6$ are alkyl groups having 1 to 6 carbon atoms and $R_4$ is a member of the group consisting of hexadecylthioethyl, hexylthiopropyl, dodecylthiopropyl, benzyl and butoxyethyl.

2. The ester of claim 1 wherein $R_1$, $R_2$, $R_5$ and $R_6$ are tert.butyl.
3. The ester of claim 2 wherein $R_4$ is dodecylthiopropyl.
4. The ester of claim 2 wherein $R_4$ is hexylthiopropyl.
5. The ester of claim 2 wherein $R_4$ is hexadecylthioethyl.
6. The ester of claim 2 wherein $R_4$ is butoxyethyl.
7. The ester of claim 2 wherein $R_4$ is benzyl.

References Cited

UNITED STATES PATENTS

| | | | |
|---|---|---|---|
| 3,054,822 | 9/1962 | Schorr et al. | 260—465 X |
| 3,247,240 | 4/1966 | Meier et al. | 260—473 |
| 3,330,859 | 7/1967 | Dexter et al. | 260—473 |
| 3,427,345 | 2/1969 | Holmen | 260—473 |
| 3,496,172 | 2/1970 | Hinkley | 260—465 |

JOSEPH REBOLD, Primary Examiner

D. A. TORRENCE, Assistant Examiner

U.S. Cl. X.R.

260—45.85, 465 D, 465.4, 570.9